United States Patent
Sugaya

(10) Patent No.: US 9,834,311 B2
(45) Date of Patent: Dec. 5, 2017

(54) UNINHABITED AIRBORNE VEHICLE AND METHOD OF CONTROLLING THE SAME

(71) Applicant: OPTiM Corporation, Saga (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 71 days.

(21) Appl. No.: 15/065,963

(22) Filed: Mar. 10, 2016

(65) Prior Publication Data

US 2017/0152051 A1   Jun. 1, 2017

(30) Foreign Application Priority Data

Nov. 26, 2015  (JP) .................................. 2015-231121

(51) Int. Cl.
  *B64C 25/00*  (2006.01)
  *B64D 25/00*  (2006.01)
  *B64C 39/02*  (2006.01)

(52) U.S. Cl.
  CPC ............ *B64D 25/00* (2013.01); *B64C 39/024* (2013.01)

(58) Field of Classification Search
  CPC ........ B64D 25/00; B64D 17/00; B64D 17/80; B64C 39/02; B64C 39/024; B64C 2201/024; B64C 2201/14; B64C 2201/18
  See application file for complete search history.

(56) References Cited

U.S. PATENT DOCUMENTS

| | | | | |
|---|---|---|---|---|
| 3,690,401 A | * | 9/1972 | Earl | B60V 3/08 180/124 |
| 3,738,597 A | * | 6/1973 | Earl | B64C 25/56 180/129 |
| 6,682,017 B1 | * | 1/2004 | Giannakopoulos | B64D 17/80 244/138 R |
| 7,873,444 B1 | * | 1/2011 | Ehrmantraut | B64C 39/024 244/17.13 |
| 7,954,752 B2 | * | 6/2011 | Smith | B64C 27/006 244/100 A |
| 8,123,162 B2 | * | 2/2012 | Sirkis | B64C 39/024 244/100 A |
| 8,474,753 B2 | * | 7/2013 | Hill | B64D 25/00 244/100 A |
| 8,622,334 B2 | * | 1/2014 | Drela | B64C 21/06 244/1 N |

(Continued)

OTHER PUBLICATIONS

DJI Drop safe / Drop speed reduction system, Nov. 14, 2015), URL:http://www.dji.com/ja/product/dropsafe.

*Primary Examiner* — Assres H Woldemaryam

(74) *Attorney, Agent, or Firm* — Lex IP Meister, PLLC

(57) ABSTRACT

The present invention is to prevent an uninhabited airborne vehicle from crashing due to fall impact and from being damaged and to protect an object and a living being at the fall point. The uninhabited airborne vehicle 100 includes a rotary wing 10 and a buffer 111 that reduces impact on the airframe when crashed. The battery charge remaining measurement module 122 and the distance measurement module 123 measure the battery charge remaining and the distance to an object, respectively, and compare the measurement with the respective thresholds. If the measurement is less than the respective thresholds, the buffer module 111 is driven by the drive module 121.

16 Claims, 14 Drawing Sheets

(56) References Cited

U.S. PATENT DOCUMENTS

| | | | |
|---|---|---|---|
| 8,870,115 B2* | 10/2014 | Lu | B64C 25/56 |
| | | | 244/100 A |
| 9,487,301 B2* | 11/2016 | Hill | B64D 25/00 |
| 2014/0319265 A1* | 10/2014 | Cacciaguerra | B64C 27/22 |
| | | | 244/6 |
| 2016/0068267 A1* | 3/2016 | Liu | B64C 39/024 |
| | | | 701/11 |
| 2016/0332739 A1* | 11/2016 | Wong | B64C 39/00 |

* cited by examiner

Fig. 1
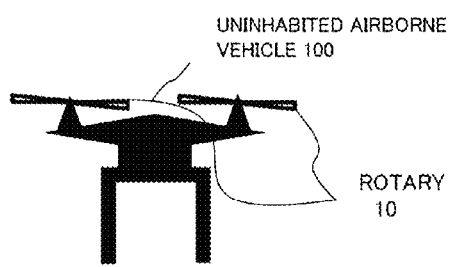
LATERAL VIEW
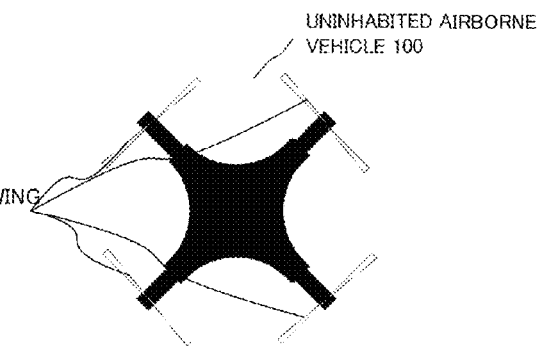
OVERHEAD VIEW
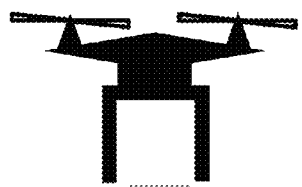
WITHOUT BUFFER
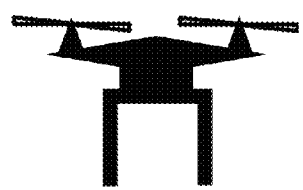
WITH BUFFER
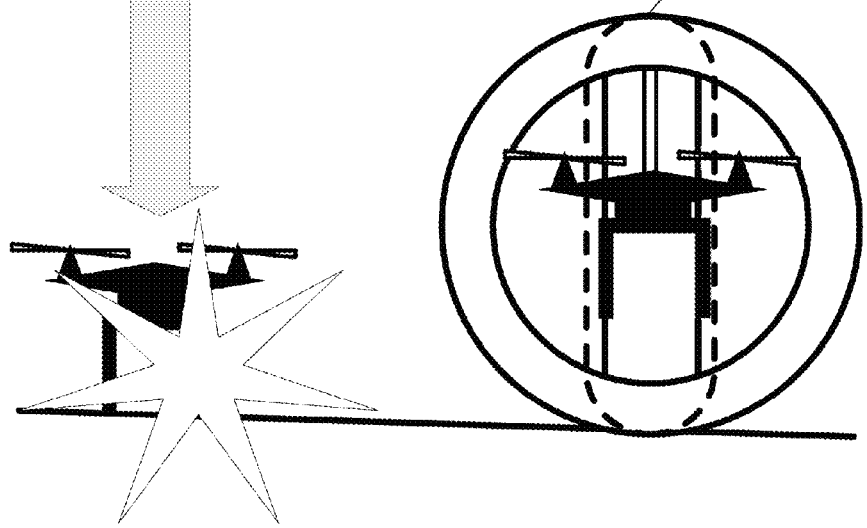

AIR BAG 30

UNINHABITED AIRBORNE VEHICLE AND METHOD OF CONTROLLING THE SAME

CROSS REFERENCE TO RELATED APPLICATIONS

This application claims priority to Japanese Patent Application No. 2015-231121 filed on Nov. 26, 2015, the entire contents of which are incorporated by reference herein.

TECHNICAL FIELD

The present invention relates to an uninhabited airborne vehicle and a method of controlling the same that are capable of reduce the impact when an uninhabited airborne vehicle is crashed.

BACKGROUND ART

Recently, uninhabited airborne vehicles that are called drones have been spread and used in industrial fields, for example, taking a picture from the sky and delivering packages. Although drones indicates all the uninhabited airborne vehicles, many are of multirotor types with a plurality of rotary wings as their main characteristics, which can control the direction and the altitude of the airframe and can be controlled by a communication method such as radio, Wi-Fi®, and Bluetooth®.

However, the number of the falling accidents caused by a dead battery or out of control is increasing as drones are spread. Accordingly, the safety when a drone falls is desired to be improved.

Therefore, a product to install a parachute in drones has been designed (Non-Patent Document 1).

CITATION LIST

Non-Patent Literature

Non-Patent Document 1: DJI Drop safe/Drop speed reduction system (retrieved on Nov. 14, 2015), the Internet (URL:http://www.dji.com/ja/product/dropsafe)

SUMMARY OF INVENTION

The product of Non-Patent Document 1 is to reduce the falling velocity of a drone by using the parachute but cannot prevent damages to the main body of a drone by fall impact and to people and property at the fall point.

Moreover, the product of Non-Patent Document 1 opens the parachute at 6 meters or more from the ground and therefore cannot produce an enough effect of reducing the falling velocity by the parachute if when a drone is at a low altitude near to the ground.

In view of the above-mentioned problems, an objective of the present invention is to provide an uninhabited airborne vehicle and a method of controlling the same that are capable of reduce the impact when an uninhabited airborne vehicle is crashed.

The first aspect of the present invention provides an uninhabited airborne vehicle including:
a rotary wing;
an airframe; and
a buffer that reduces impact on the airframe when crashed.
According to the first aspect of the present invention, an uninhabited airborne vehicle includes:
a rotary wing;
an airframe; and
a buffer that reduces impact on the airframe when crashed.

The first aspect of the present invention is the category of an uninhabited airborne vehicle, but the categories of a method of controlling an uninhabited airborne vehicle have similar functions and effects.

The second aspect of the present invention provides an uninhabited airborne vehicle including:
a rotary wing;
an airframe;
a buffer that reduces impact on the airframe when crashed;
a battery charge remaining meter that measures the battery charge remaining of the uninhabited airborne vehicle; and
a driver that drives the buffer if the battery charge remaining is less than a threshold while the uninhabited airborne vehicle is flying.

According to the second aspect of the present invention, an uninhabited airborne vehicle includes:
a rotary wing;
an airframe;
a buffer that reduces impact on the airframe when crashed;
a battery charge remaining meter that measures the battery charge remaining of the uninhabited airborne vehicle; and
a driver that drives the buffer if the battery charge remaining is less than a threshold while the uninhabited airborne vehicle is flying.

The third aspect of the present invention provides an uninhabited airborne vehicle including:
a rotary wing;
an airframe;
a buffer that reduces impact on the airframe when crashed;
a distance meter that measures the distance between the uninhabited airborne vehicle and an object; and
a driver that drives the buffer if the distance is less than a threshold while the uninhabited airborne vehicle is flying.

According to the third aspect of the present invention, an uninhabited airborne vehicle includes:
a rotary wing;
an airframe;
a buffer that reduces impact on the airframe when crashed;
a distance meter that measures the distance between the uninhabited airborne vehicle and an object; and
a driver that drives the buffer if the distance is less than a threshold while the uninhabited airborne vehicle is flying.

The fourth aspect of the present invention provides the uninhabited airborne vehicle according to the third aspect of the present invention, in which the distance meter removes frequency noise caused by a rotary wing of the uninhabited airborne vehicle while measuring the distance between the uninhabited airborne vehicle and an object.

According to the fourth aspect of the present invention, in the uninhabited airborne vehicle according to the third aspect of the present invention, the distance meter removes frequency noise caused by a rotary wing of the uninhabited airborne vehicle while measuring the distance between the uninhabited airborne vehicle and an object.

The fifth aspect of the present invention provides the uninhabited airborne vehicle according to the second aspect of the present invention, in which the driver does not drive the buffer if the uninhabited airborne vehicle makes a landing by a landing instruction from an operator.

According to the fifth aspect of the present invention, in the uninhabited airborne vehicle according to the second aspect of the present invention, the driver does not drive the buffer if the uninhabited airborne vehicle makes a landing by a landing instruction from an operator.

The sixth aspect of the present invention provides the uninhabited airborne vehicle according to the second aspect of the present invention further including a moving velocity meter that measures the moving velocity of the uninhabited airborne vehicle, in which the driver does not drive the buffer if the moving velocity of the uninhabited airborne vehicle is less than a threshold.

According to the sixth aspect of the present invention, the uninhabited airborne vehicle according to the second aspect of the present invention further includes a moving velocity meter that measures the moving velocity of the uninhabited airborne vehicle, in which the driver does not drive the buffer if the moving velocity of the uninhabited airborne vehicle is less than a threshold.

The seventh aspect of the present invention provides the uninhabited airborne vehicle according to the first aspect of the present invention, in which the buffer has a form to wrap the uninhabited airborne vehicle.

According to the seventh aspect of the present invention, in the uninhabited airborne vehicle according to the first aspect of the present invention, the buffer has a form to wrap the uninhabited airborne vehicle.

The eighth aspect of the present invention provides a method of controlling an uninhabited airborne vehicle including a rotary wing and an airframe, including a buffer step of reducing impact on the airframe when the uninhabited airborne vehicle is crashed.

The present invention can provide an uninhabited airborne vehicle and a method of controlling the same that are capable of reduce the impact when an uninhabited airborne vehicle is crashed.

BRIEF DESCRIPTION OF DRAWINGS

FIG. 1 shows a schematic diagram of the uninhabited airborne vehicle 100 according to a preferable embodiment of the present invention.

DESCRIPTION OF EMBODIMENTS

Embodiments of the present invention will be described below with reference to the attached drawings. However, this is illustrative only, and the technological scope of the present invention is not limited thereto.

Uninhabited Airborne Vehicle 100

FIG. 1 shows a schematic diagram of the uninhabited airborne vehicle 100 according to a preferable embodiment of the present invention. The overview of the present invention will be described below with reference to FIG. 1.

Figure 2:
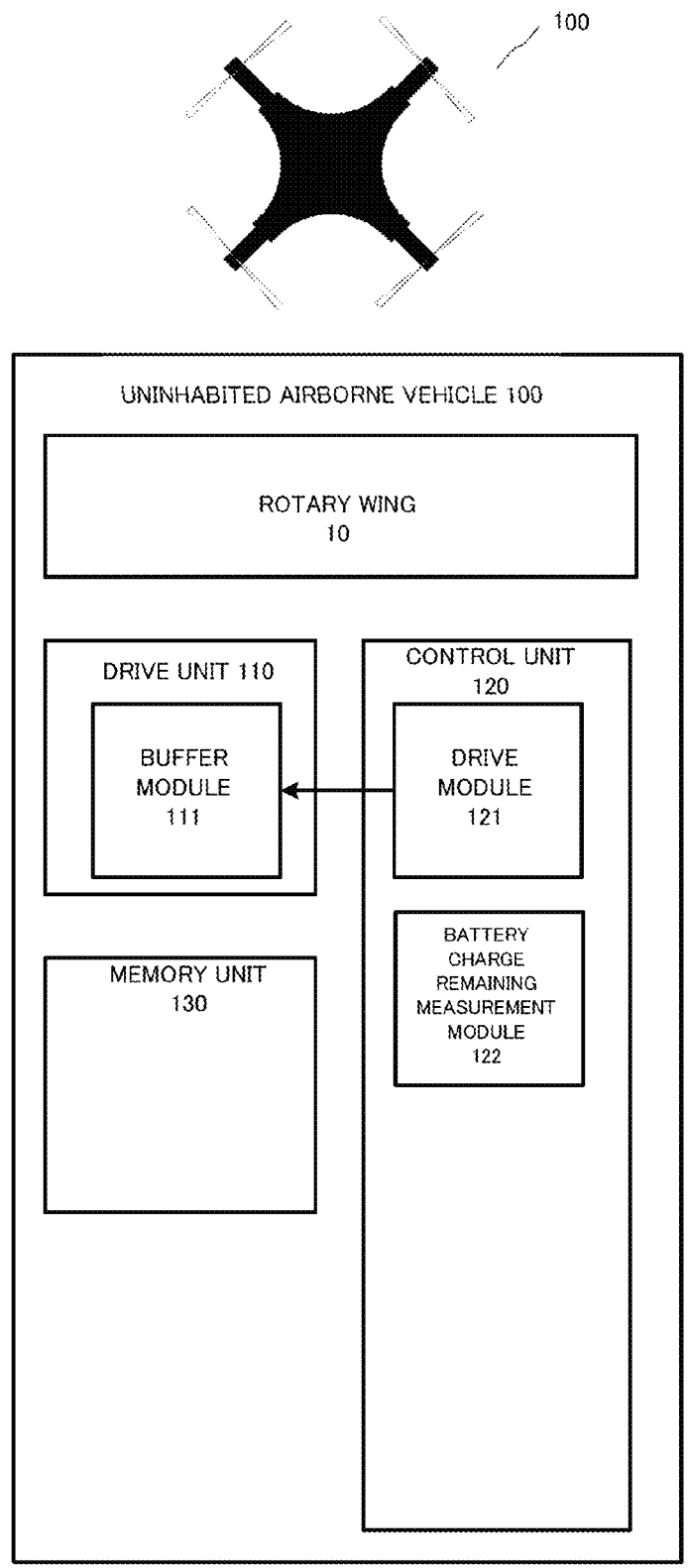
FIG. 2 shows a functional block diagram of the uninhabited airborne vehicle 100 when the battery charge remaining is measured to show the relationship among the functions.

The uninhabited airborne vehicle 100 is an aircraft capable of unmanned flight, which includes a rotary wing 10, a drive unit 110, a control unit 120, and a memory unit 130 as shown in FIG. 2. The drive unit 110 includes a buffer module 111, and the control unit 120 includes a drive module 121 and a battery charge remaining measurement module 122.

Specifically, the buffer module 111 may be an air-bag system. Since the uninhabited airborne vehicle is often spinning when falling to the ground, the buffer module 111 has a preferable shape to wrap the entire uninhabited airborne vehicle so that the buffer module 111 can buffer the airframe from crash from any angles. Therefore, the air-bag system forms an approximate sphere formed by combining circular rings after the air-bag system is driven to protect the entire uninhabited airborne vehicle.

The upper left and the upper right of FIG. 1 show an uninhabited airborne vehicle 100 viewed from the side and the above, respectively. In this embodiment, the uninhabited airborne vehicle 100 includes four rotary wings 10 as an example.

The lower left of FIG. 1 shows an example case where the uninhabited airborne vehicle 100 falls with no buffers. In this case, the fall impact may cause severe damages to the uninhabited airborne vehicle 100 itself and to people and property at the fall point.

The lower right of FIG. 1 shows an example case where the uninhabited airborne vehicle 100 falls with a buffer. The uninhabited airborne vehicle 100 includes an air-bag system as the buffer module 111. In this case, the buffer module 111 attenuates the fall impact to reduce damages to the uninhabited airborne vehicle 100 itself and to people and property at the fall point.

Figure 13:
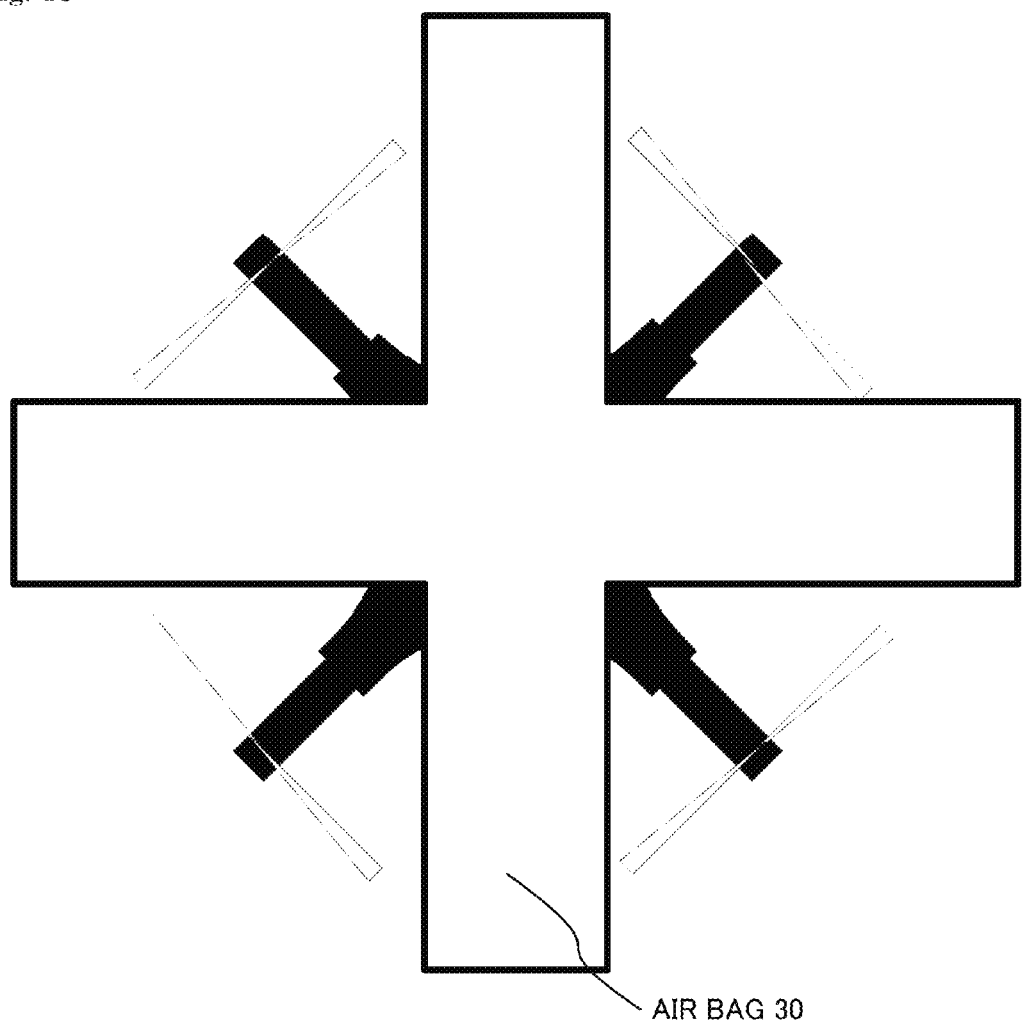
FIG. 13 shows an overhead view of the uninhabited airborne vehicle 100 after the buffer is driven.

FIG. 13 shows an overhead view of the uninhabited airborne vehicle 100 after the buffer is driven. Since the uninhabited airborne vehicle 100 has four rotary wings in the example of FIG. 13, an air bag 30 is formed by combining two circular rings to exist between each pair of the adjacent rotary wings. When there are six rotary wings, three circular rings may be combined to form an air bag to exist between each pair of the adjacent rotary wings. The air bag 30 should have an enough buffer performance in consideration of the maximum flight altitude and the weight of the uninhabited airborne vehicle 100. The air bag 30 also should have a size and a shape so as to protect the entire uninhabited airborne vehicle including the rotary wings regardless of the impact angle of the uninhabited airborne vehicle 100. When the uninhabited airborne vehicle 100 can carry an external camera, the air bag 30 should have a preferable performance and shape in consideration of the weight and the attachment position of the camera.

Figure 14:
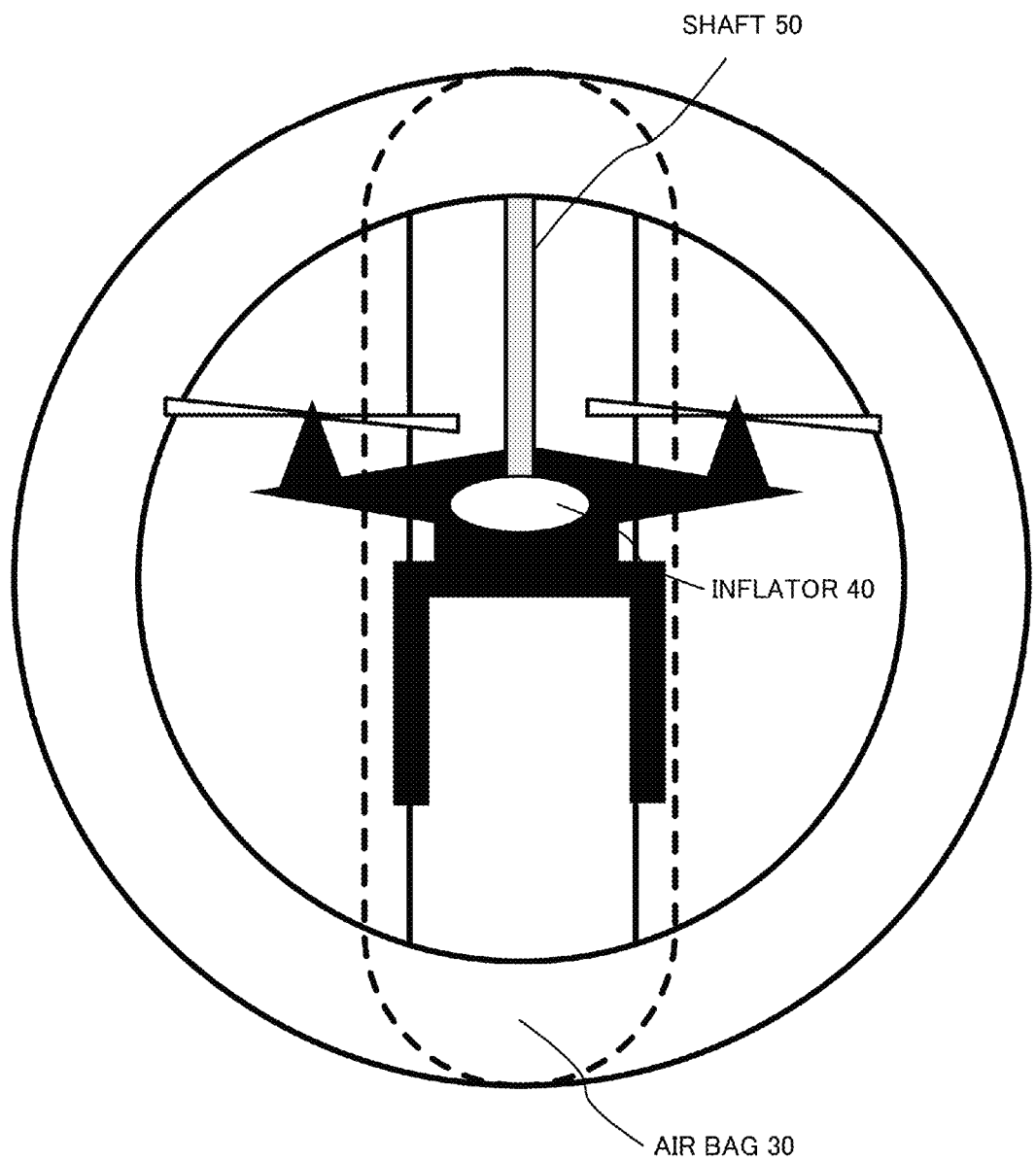
FIG. 14 shows a lateral view of the uninhabited airborne vehicle 100 after the buffer is driven.

FIG. 14 shows a lateral view of the uninhabited airborne vehicle 100 after the buffer is driven. In this figure, the circular ring in the front side of the uninhabited airborne vehicle 100 in a dotted line. When driving the air-bag system as the buffer module 111, the drive module 121 transmits an ignition instruction to the inflator (gas generator) 40 of the uninhabited airborne vehicle 100 to generate gas in a chemical reaction by burning. The shaft 50 with a cave inside to supply gas and the air bag 30 are stored in the uninhabited airborne vehicle 100 under normal conditions. The gas generated from the inflator 40 develops the air bug 30 and the shaft 50 outside of the uninhabited airborne vehicle 100 as shown in FIG. 14. This embodiment uses a shaft 50 as an example. However, if the structures of the uninhabited airborne vehicle 100 and the air bag 30 can appropriately develop the air bag 30 without any shafts 50 so as to protect the uninhabited airborne vehicle 100, the shaft 50 can be omitted.

In this embodiment, the air bag is formed by combining circular rings. However, the rings are not necessarily O-shaped like a swimming ring and may be C-shaped to easily store inside and develop outside of the uninhabited airborne vehicle 100.

Functions

FIG. 2 shows a functional block diagram of the uninhabited airborne vehicle 100 to show the relationship among the functions.

The uninhabited airborne vehicle 100 is an aircraft capable of unmanned flight, which includes a rotary wing 10, a drive unit 110, a control unit 120, and a memory unit 130. The drive unit 110 includes a buffer module 111, and the control unit 120 includes a drive module 121 and a battery charge remaining measurement module 122.

The number of the rotary wings 10 may be more than one. The rotary wings 10 generate enough floatation so that the uninhabited airborne vehicle 100 can fly.

The drive unit 110 includes a buffer module 111. The buffer module 111 may be an air-bag system. The air-bag system ignites the inflator 40 of the uninhabited airborne vehicle 100 to generate gas in a chemical reaction by burning so that the shaft 50 and the air bag 30 are developed.

The control unit 120 includes a central processing unit (hereinafter referred to as "CPU"), a random access memory (hereinafter referred to as "RAM"), and a read only memory (hereinafter referred to as "ROM"). The control unit 120 includes a drive module 121 and a battery charge remaining measurement module 122. The drive module 121 transmits drive information to the buffer module 111. The battery charge remaining measurement module 122 measures the battery charge remaining to check if the battery charge remaining is less than a certain threshold, while the uninhabited airborne vehicle 100 is flying.

The memory unit 130 includes a data storage unit such as a hard disk or a semiconductor memory. The memory unit 130 can store necessary information such as a threshold of the above-mentioned battery charge remaining.

Buffer Driving Process by Battery Charge Remaining Measurement

Figure 3:
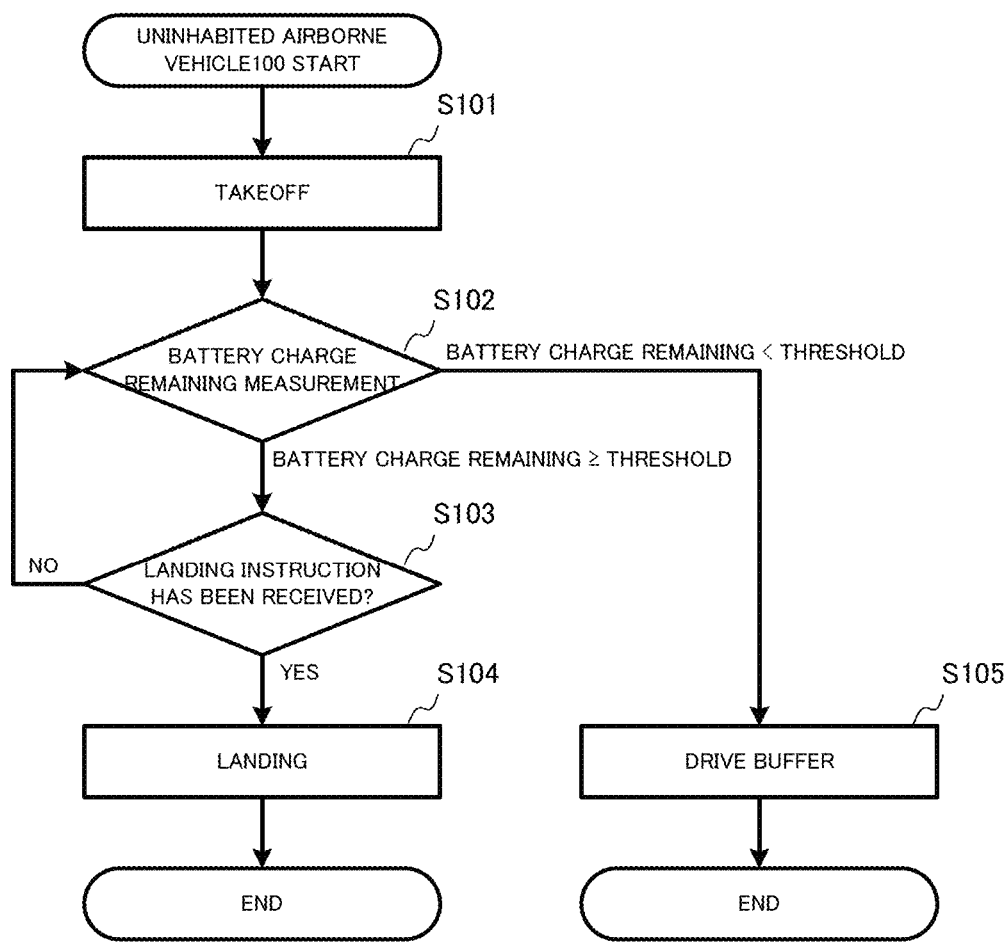
FIG. 3 shows a flow chart of the buffer driving process performed by the uninhabited airborne vehicle 100 when the battery charge remaining is measured.

FIG. 3 shows a flow chart of the buffer driving process performed by the uninhabited airborne vehicle 100 when the battery charge remaining is measured. The processes performed by the units and the modules of the above-mentioned device are explained below together with this process.

First, the rotary wing 10 is rotated by the instruction from the control unit 120 to make the uninhabited airborne vehicle 100 take off (step S101).

The battery charge remaining measurement module 122 starts to measure the battery charge remaining of the uninhabited airborne vehicle 100 after the uninhabited airborne vehicle 100 takes off (step S102).

If the battery charge remaining is less than a threshold, the battery charge remaining measurement module 122 judges that the uninhabited airborne vehicle 100 may fall due to battery shortage. Then, the drive module 121 of the control unit 120 drives the buffer module 111 of the drive unit 110 (step S105). The buffer module 111 may be an air-bag system. The form of the air-bag system is as described above in reference to FIGS. 13 and 14.

If the battery charge remaining is a threshold or more, the battery charge remaining measurement module 122 checks whether or not a landing instruction has been received (step S103).

If a landing instruction has been received, the uninhabited airborne vehicle 100 is made to land on the ground (step S104). If a landing instruction has not been received, the process returns to the battery charge remaining measurement in the step S102.

In this flow, immediately after checking that a landing instruction has been received in the step S103, the uninhabited airborne vehicle 100 is made to land on the ground in the step S104. If it takes a time to make the uninhabited airborne vehicle 100 to land on the ground because, for example, the uninhabited airborne vehicle 100 is up in the air, the battery charge remaining measurement in the step S102 may be continued until the uninhabited airborne vehicle 100 actually lands on the ground.

The interval of measurements of the battery charge remaining measurement may coincide with the performance of the uninhabited airborne vehicle 100 and may include an appropriate waiting time.

The threshold of the battery charge remaining can be changed by instruction from a user.

Buffer Driving Process by Distance Measurement

Figure 4:
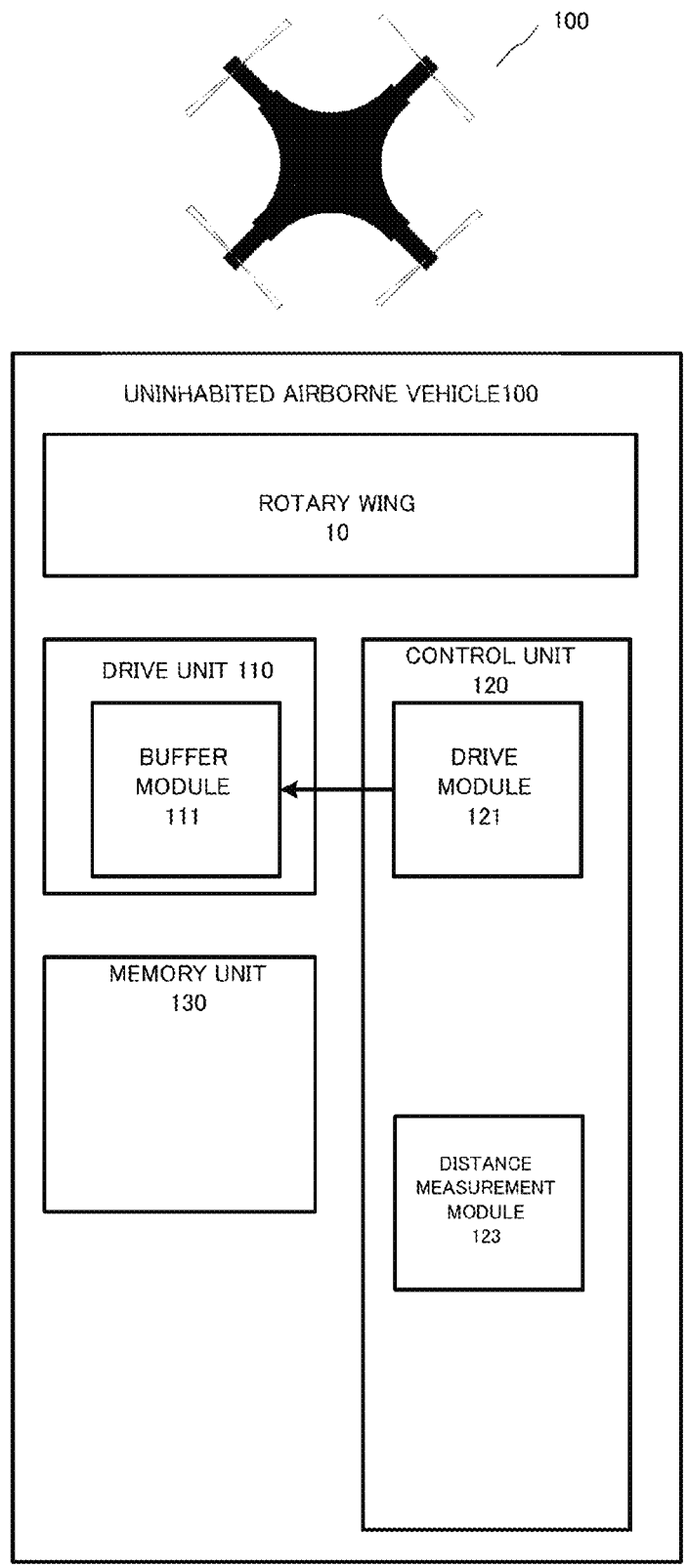
FIG. 4 shows a functional block diagram of the uninhabited airborne vehicle 100 when the distance is measured to show the relationship among the functions.
Figure 5:
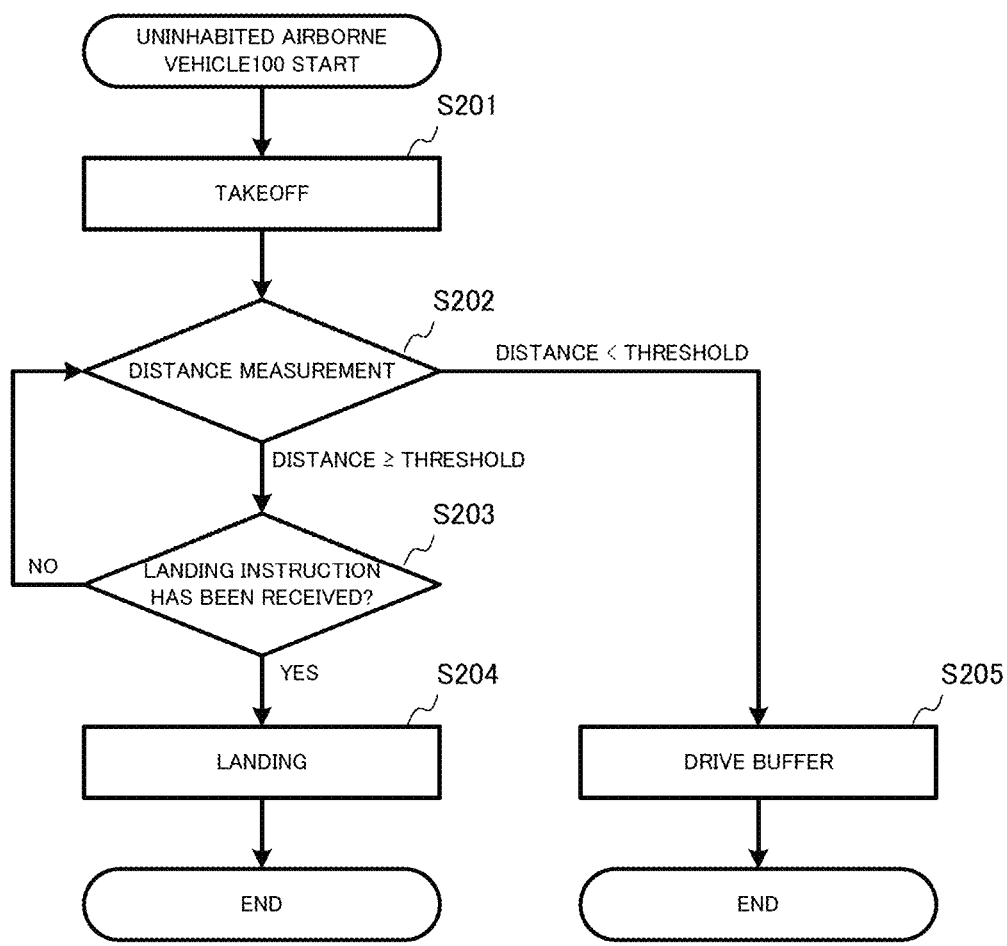
FIG. 5 shows a flow chart of the buffer driving process performed by the uninhabited airborne vehicle 100 when the distance is measured.

FIG. 4 shows a functional block diagram of the uninhabited airborne vehicle 100 when the distance is measured to show the relationship among the functions. FIG. 5 shows a flow chart of the buffer driving process performed by the uninhabited airborne vehicle 100 when the distance is measured. The difference from FIGS. 2 and 3 will be mainly described below.

As shown in FIG. 4, the control unit 120 includes a drive module 121 and a distance measurement module 123. The drive module 121 transmits drive information to the buffer module 111 of the drive unit 110. The distance measurement module 123 measures the distance to an object to check if the distance is less than a certain threshold, while the uninhabited airborne vehicle 100 is flying.

The memory unit 130 includes a data storage unit such as a hard disk or a semiconductor memory. The memory unit 130 can store necessary information such as the threshold of the above-mentioned distance to an object.

Figure 12:
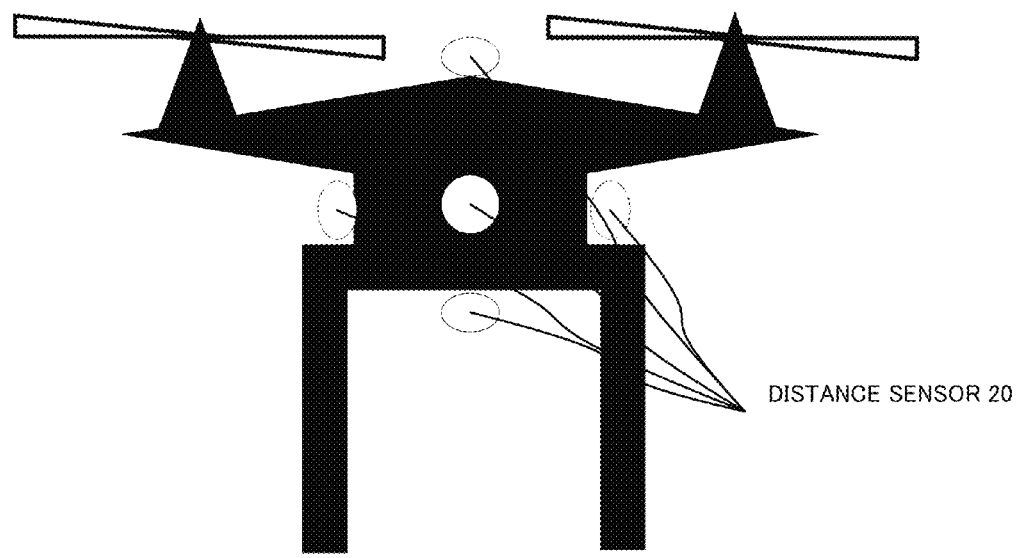
FIG. 12 shows one example of the position of distance sensors to be mounted on the uninhabited airborne vehicle 100.

FIG. 12 shows one example of the position of distance sensors 20 mounted on the uninhabited airborne vehicle 100. In this figure, distance sensors 20 each are mounted to face six different (back, fourth, right, left, upper, and lower) directions to detect the distance to an object to be crashed with the uninhabited airborne vehicle 100. When the distance sensors 20 are mounted inside from the rotary wings or the foot parts of the uninhabited airborne vehicle 100, the mounting positions of the sensors should be considered to set the distance to an object to be crashed with the uninhabited airborne vehicle 100. In this embodiment, distance sensors 20 each are mounted to face six different directions as an example. However, the number and the mounting positions of the distance sensors may be appropriately set according to the condition such as the performance of the distance sensors 20 and the shape of the uninhabited airborne vehicle 100.

First, the rotary wing 10 is rotated by instruction from the control unit 120 to make the uninhabited airborne vehicle 100 take off (step S201).

The distance measurement module 123 starts to measure the distance between the uninhabited airborne vehicle 100 and an object after the uninhabited airborne vehicle 100 takes off (step S202).

When the distance between the uninhabited airborne vehicle 100 and the object is measured, frequency noise generated from the rotary wings 10 may affect the distance sensors 20. In this case, the frequency noise is appropriately removed in concordance with the rotational speed of the rotation wings 10 to measure the distance to an object. The method of removing frequency noise does not really matter and may be any general method.

If the distance to an object is less than a threshold, the distance measurement module 123 judges that the uninhabited airborne vehicle comes in contact with the object or is just about to fall to the ground. Then, the drive module 121 of the control unit 120 drives the buffer module 111 of the drive unit 110 (step S205). The buffer module 111 may be an air-bag system. The form of the air-bag system is described above in reference to FIGS. 13 and 14.

If the distance to an object is a threshold or more, the distance measurement module 123 checks whether or not the distance measurement module 123 has received a landing instruction (step S203).

If a landing instruction has been received, the uninhabited airborne vehicle 100 is made to land on the ground (step S204). If a landing instruction has not been received, the process returns to the distance measurement in the step S202.

As shown in this flow, when the uninhabited airborne vehicle 100 is made to land on the ground by a landing instruction, the buffer module 111 is not driven even if the distance to the ground is less than a threshold of the distance to an object.

The interval of measurements of the distance to an object may coincide with the performance of the uninhabited airborne vehicle 100 and may include an appropriate waiting time.

The threshold of the distance to an object can be changed by instruction from a user.

Figure 6:
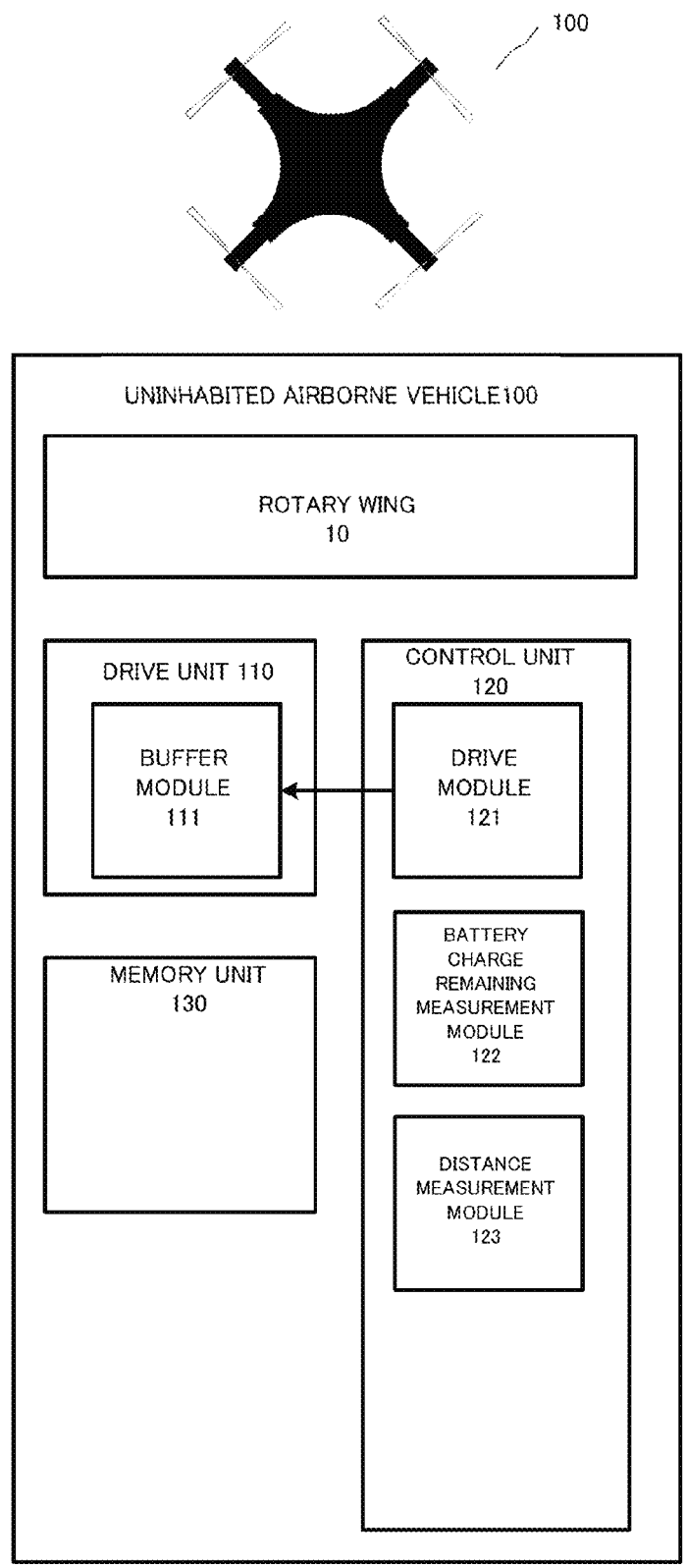
FIG. 6 shows a functional block diagram of the uninhabited airborne vehicle 100 when the battery charge remaining and the distance are measured to show the relationship among the functions.
Figure 7:
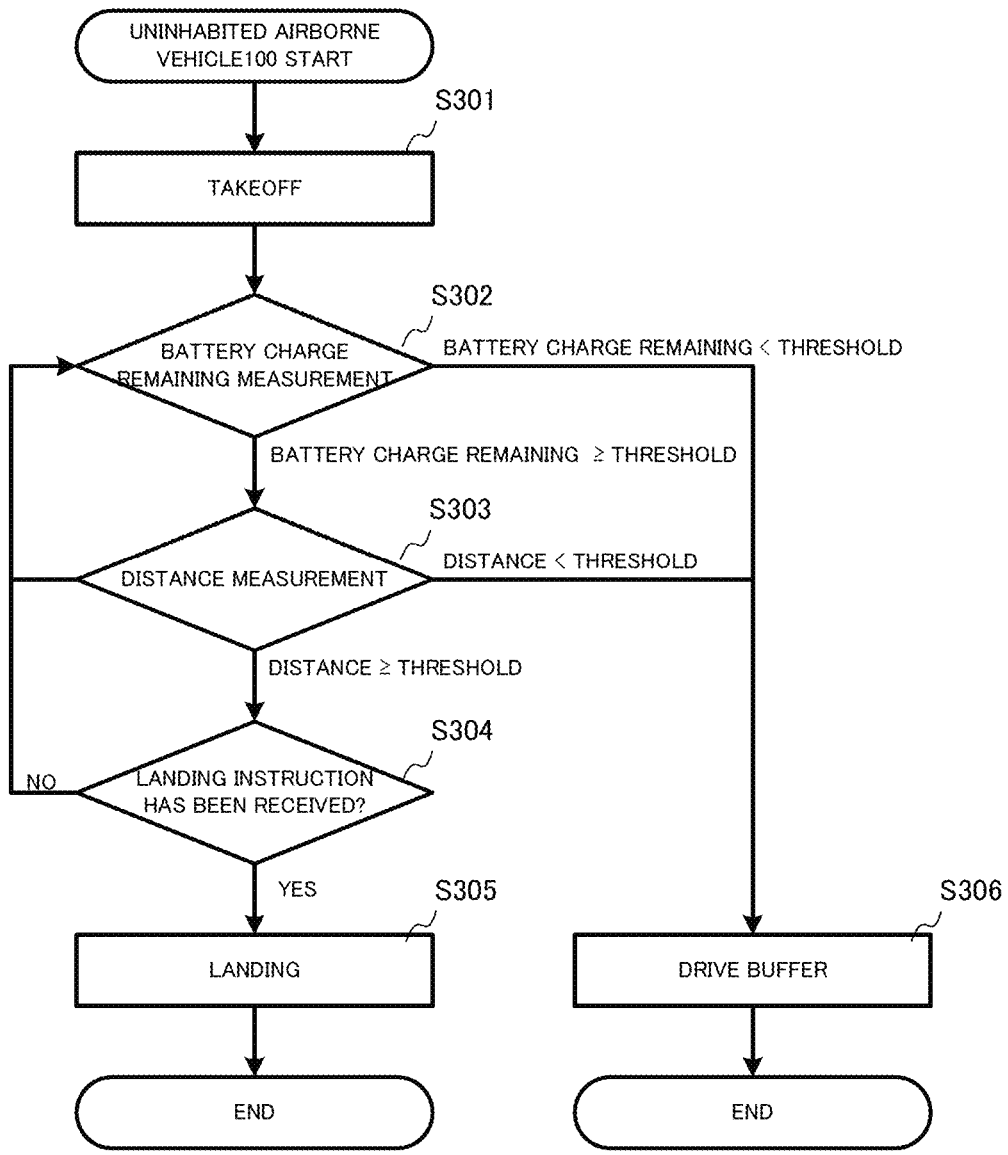
FIG. 7 shows a flow chart of the buffer driving process performed by the uninhabited airborne vehicle 100 when the battery charge remaining and the distance are measured.

Buffer Driving Process in Battery Charge Remaining Measurement and Distance Measurement FIG. 6 shows a functional block diagram of the uninhabited airborne vehicle 100 when the battery charge remaining and the distance are measured to show the relationship among the functions. FIG. 7 shows a flow chart of the buffer driving process performed by the uninhabited airborne vehicle 100 when the battery charge remaining and the distance are measured. The difference from FIGS. 2 to 5 will be mainly described below.

As shown in FIG. 6, the control unit 120 includes a drive module 121, a battery charge remaining measurement module 122, and a distance measurement module 123. The drive module 121 transmits drive information to the buffer module 111 of the drive unit 110. The battery charge remaining measurement module 122 measures the battery charge remaining to check if the battery charge remaining is less than a certain threshold, while the uninhabited airborne vehicle 100 is flying. The distance measurement module 123 measures the distance to an object to check if the distance is less than a certain threshold, while the uninhabited airborne vehicle 100 is flying.

The memory unit 130 includes a data storage unit such as a hard disk or a semiconductor memory. The memory unit 130 can store necessary information such as thresholds of the above-mentioned battery charge remaining and distance to an object.

First, the rotary wing 10 is rotated by instruction from the control unit 120 to make the uninhabited airborne vehicle 100 take off (step S301).

The battery charge remaining measurement module 122 starts to measure the battery charge remaining of the uninhabited airborne vehicle 100 after the uninhabited airborne vehicle 100 takes off (step S302).

If the battery charge remaining is less than a threshold, the battery charge remaining measurement module 122 judges that the uninhabited airborne vehicle 100 may fall due to battery shortage. Then, the drive module 121 of the control unit 120 drives the buffer module 111 of the drive unit 110 (step S306).

If the battery charge remaining is a threshold or more, the distance measurement module 123 measures the distance between the uninhabited airborne vehicle 100 and an object (step S303).

If the distance to an object is less than a threshold, the distance measurement module 123 judges that the uninhabited airborne vehicle comes in contact with the object or is just about to fall to the ground. Then, the drive module 121 of the control unit 120 drives the buffer module 111 of the drive unit 110 (step S306).

If the distance to an object is a threshold or more, the distance measurement module 123 checks whether or not the distance measurement module 123 has received a landing instruction (step S304).

If a landing instruction has been received, the uninhabited airborne vehicle 100 is made to land on the ground (step S305). If a landing instruction has not been received, the process returns to the battery charge remaining measurement in the step S302.

In this flow, immediately after checking that a landing instruction has been received in the step S304, the uninhabited airborne vehicle 100 is made to land on the ground in the step S305. If it takes a time to make the uninhabited airborne vehicle 100 to land on the ground because, for example, the uninhabited airborne vehicle 100 is up in the air, the battery charge remaining measurement in the step S302 may be continued until the uninhabited airborne vehicle 100 actually lands on the ground. However, when the uninhabited airborne vehicle 100 is made to land on the ground by a landing instruction, the buffer module 111 is not driven even if the distance to the ground is less than a threshold of the distance to an object.

The interval of measurements of the battery charge remaining and the distance to an object may coincide with the performance of the uninhabited airborne vehicle 100 and may include an appropriate waiting time.

The thresholds of the battery charge remaining and the distance to an object can be changed by instruction from a user.

Buffer Driving Process in Moving Velocity Measurement

Figure 8:
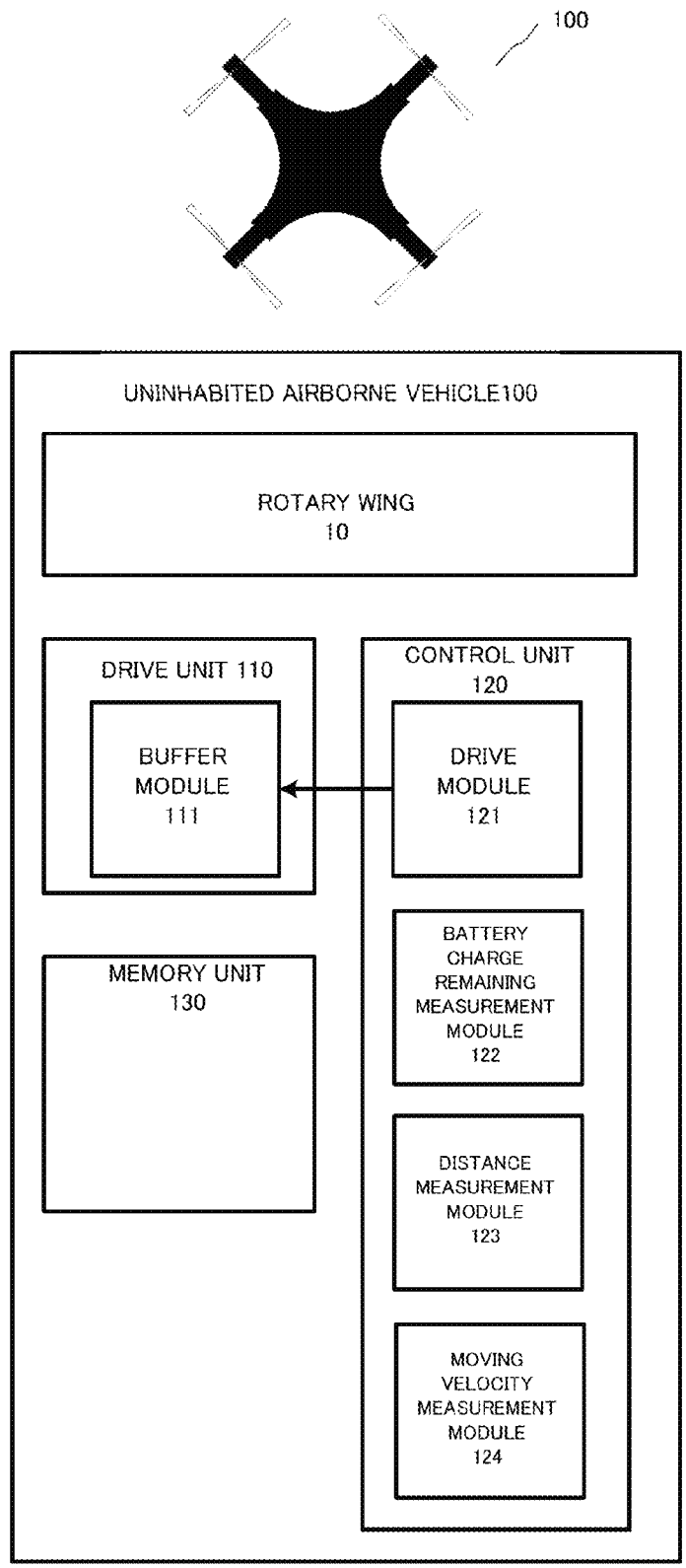
FIG. 8 shows a functional block diagram of the uninhabited airborne vehicle 100 when the moving velocity is measured to show the relationship among the functions.
Figure 9:
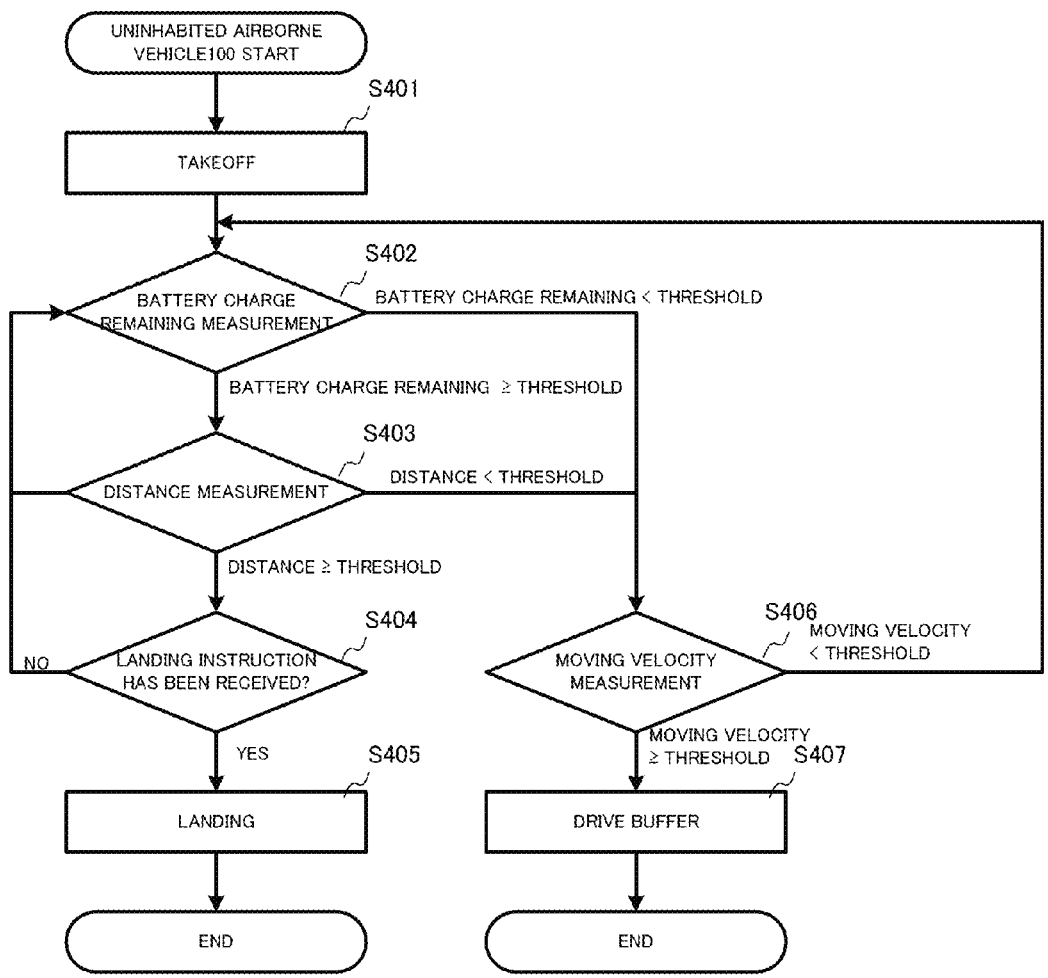
FIG. 9 shows a flow chart of the buffer driving process performed by the uninhabited airborne vehicle 100 when the moving velocity is measured.

FIG. 8 shows a functional block diagram of the uninhabited airborne vehicle 100 when the moving velocity is measured to show the relationship among the functions in addition to the example of FIG. 6. FIG. 9 shows a flow chart of the buffer driving process performed by the uninhabited airborne vehicle 100 when the moving velocity is measured in addition to the example of FIG. 7. The difference from FIGS. 6 and 7 will be mainly described below.

As shown in FIG. 8, the control unit 120 includes a drive module 121, a battery charge remaining measurement module 122, a distance measurement module 123, and a moving velocity measurement module 124. The drive module 121 transmits drive information to the buffer module 111 of the drive unit 110. The battery charge remaining measurement module 122 measures the battery charge remaining to check if the battery charge remaining is less than a certain threshold, while the uninhabited airborne vehicle 100 is flying. The distance measurement module 123 measures the distance to an object to check if the distance is less than a certain threshold, while the uninhabited airborne vehicle 100 is flying. The moving velocity measurement module 124 measures the moving velocity to check if the moving velocity is less than a certain threshold, while the uninhabited airborne vehicle 100 is flying. Examples of the moving velocity measurement module 124 may include a velocity sensor and an acceleration sensor.

The memory unit 130 includes a data storage unit such as a hard disk or a semiconductor memory. The memory unit 130 can store necessary information such as thresholds of the above-mentioned battery charge remaining, distance to an object, and moving velocity.

First, the rotary wing 10 is rotated by instruction from the control unit 120 to make the uninhabited airborne vehicle 100 take off (step S401).

The battery charge remaining measurement module 122 starts to measure the battery charge remaining of the uninhabited airborne vehicle 100 after the uninhabited airborne vehicle 100 takes off (step S402).

If the battery charge remaining is less than a threshold, the battery charge remaining measurement module 122 judges that the uninhabited airborne vehicle 100 may fall due to battery shortage. Then, the moving velocity measurement module 124 measures the moving velocity of the uninhabited airborne vehicle 100 (step S406).

If the moving velocity of the uninhabited airborne vehicle 100 is a threshold or more, the moving velocity measurement module 124 judges that the uninhabited airborne vehicle 100 is falling to the ground or crashing to an object at a high velocity. Then, the drive module 121 of the control unit 120 drives the buffer module 111 of the drive unit 110 (step S407).

If the moving velocity of the uninhabited airborne vehicle 100 is less than a threshold, the process returns to the step S402 and continues.

If the battery charge remaining is a threshold or more, the distance measurement module 123 measures the distance between the uninhabited airborne vehicle 100 and an object (step S403).

If the distance to an object is less than a threshold, the distance measurement module 123 judges that the uninhabited airborne vehicle comes in contact with the object or is just about to fall to the ground. Then, the moving velocity measurement module 124 measures the moving velocity of the uninhabited airborne vehicle 100 (step S406).

If the moving velocity of the uninhabited airborne vehicle 100 is a threshold or more, the moving velocity measurement module 124 judges that the uninhabited airborne vehicle 100 is falling to the ground or crashing to an object at a high velocity. Then, the drive module 121 of the control unit 120 drives the buffer module 111 of the drive unit 110 (step S407).

If the moving velocity of the uninhabited airborne vehicle 100 is less than a threshold, the process returns to the step S402 and continues.

If the distance to an object is a threshold or more, the distance measurement module 123 checks whether or not the distance measurement module 123 has received a landing instruction (step S404).

If a landing instruction has been received, the uninhabited airborne vehicle 100 is made to land on the ground (step S405). If a landing instruction has not been received, the process returns to the battery charge remaining measurement in the step S402.

In this flow, immediately after checking that a landing instruction has been received in the step S404, the uninhabited airborne vehicle 100 is made to land on the ground in the step S405. If it takes a time to make the uninhabited airborne vehicle 100 to land on the ground because, for example, the uninhabited airborne vehicle 100 is up in the air, the battery charge remaining measurement in the step S402 may be continued until the uninhabited airborne vehicle 100 actually lands on the ground. However, when the uninhabited airborne vehicle 100 is made to land on the ground by a landing instruction, the buffer module 111 is not driven even if the distance to the ground is less than a threshold of the distance to an object.

The interval of measurements of the battery charge remaining and the distance to an object may coincide with the performance of the uninhabited airborne vehicle 100 and may include an appropriate waiting time.

The thresholds of the battery charge remaining, the distance to an object, and the moving velocity can be changed by instruction from a user.

Uninhabited Airborne Vehicle 100 and Controller 200

The uninhabited airborne vehicle 100 may be controlled by a controller 200. The communication between the uninhabited airborne vehicle 100 and the controller 200 is mainly wireless communication. The wireless communication mainly uses the frequency band of 2.4 GHz which is the same as that Wi-Fi® and Bluetooth® or of 73 MHz for a radio controller in Japan. In the present invention, the communication between the uninhabited airborne vehicle 100 and the controller 200 only has to be feasible and is not limited by a frequency band, in particular.

Figure 10:
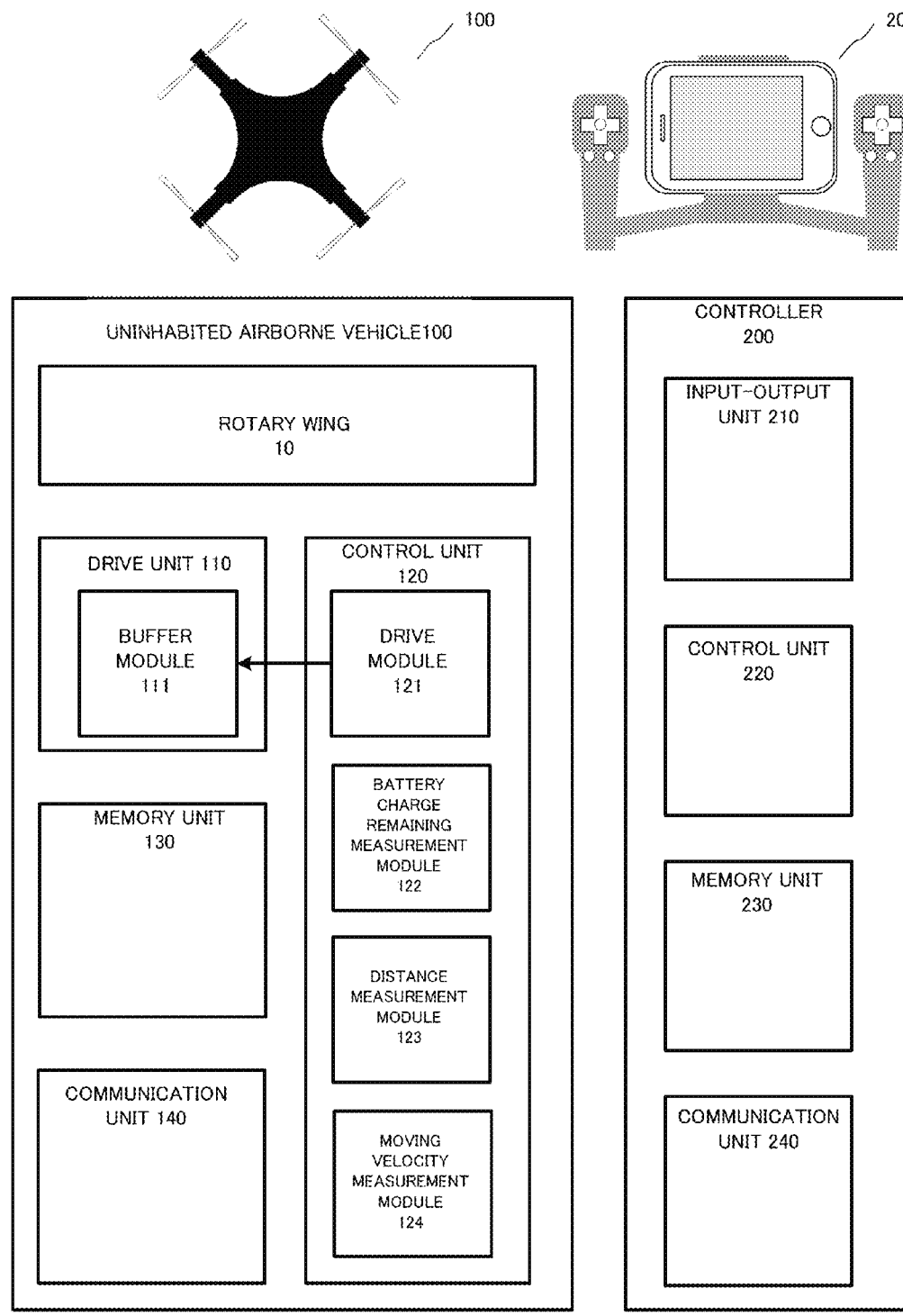
FIG. 10 shows a functional block diagram of the uninhabited airborne vehicle 100 and the controller 200 to illustrate the relationship among the functions.
Figure 11:
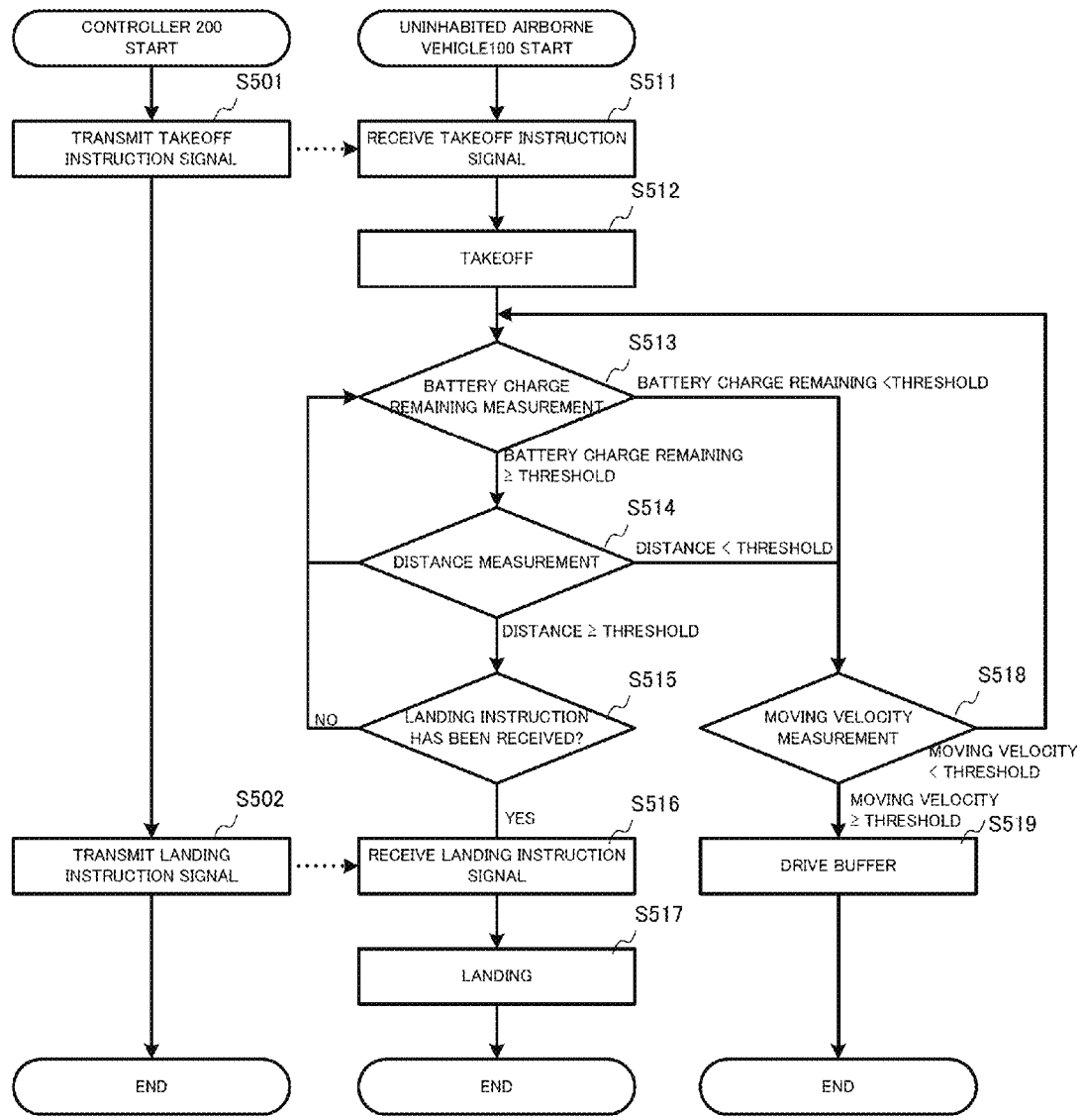
FIG. 11 shows a flow chart of the buffer driving process performed by the uninhabited airborne vehicle 100 and the controller 200.

FIG. 10 shows a functional block diagram of the uninhabited airborne vehicle 100 and the controller 200 to illustrate the relationship among the functions. This embodiment shows an example of the uninhabited airborne vehicle 100 including all of a battery charge remaining meter, a distance meter, and a velocity meter. If the uninhabited airborne vehicle 100 includes any of these, the relationship between the uninhabited airborne vehicle 100 and the controller 200 is established. FIG. 11 shows a flow chart of the buffer driving process performed by the uninhabited airborne vehicle 100 and the controller 200. The difference from the above-mentioned examples will be mainly described below.

The uninhabited airborne vehicle 100 is an aircraft capable of unmanned flight, which includes a rotary wing 10, a drive unit 110, a control unit 120, a memory unit 130, and a communication unit 140. The controller 200 includes an input-output unit 210, a control unit 220, a memory unit 230, and a communication unit 240.

The number of the rotary wings 10 may be more than one. The rotary wings 10 generate enough floatation so that the uninhabited airborne vehicle 100 can fly.

The drive unit 110 includes a buffer module 111. The buffer module 111 may be an air-bag system. The air-bag system ignites the inflator 40 of the uninhabited airborne vehicle 100 to generate gas in a chemical reaction by burning so that the shaft 50 and the air bag 30 develop.

The control unit 120 includes a CPU, a RAM, and a ROM. The control unit 120 includes a drive module 121, a battery charge remaining measurement module 122, a distance measurement module 123, and a moving velocity measurement module 124. The drive module 121 transmits drive information to the buffer module 111.

The memory unit 130 includes a data storage unit such as a hard disk or a semiconductor memory. The memory unit 130 can store necessary information, for example, various thresholds.

The communication unit 140 wirelessly communicates with the controller 200. The communication unit 140 receives a takeoff instruction signal and a landing instruction signal from the controller 200. The communication unit 140 also receives other instruction signals necessary for the flight. The communication unit 140 also transmits and receives data to and from the controller 200 as appropriate.

The controller 200 may be not only a specialized transmitter (proportional controller) for the uninhabited airborne vehicle 100 but also a general information appliance such as a smart phone, a tablet PC, and a PC with a wireless communication function that are available as the transmitter. The form in which a smart phone is attached to a specialized transmitter as shown in FIG. 10 is merely an example.

The input-output unit 210 includes an input unit that performs an input necessary for the control such as takeoff and landing. The input-output unit 210 may also include an output unit that outputs the state of the uninhabited airborne vehicle 100.

The control unit 220 includes a CPU, a RAM, and a ROM.

The memory unit 230 includes a data storage unit such as a hard disk or a semiconductor memory. The memory unit 230 of the controller 200 may store necessary information, for example, various thresholds.

The communication unit 240 wirelessly communicates with the uninhabited airborne vehicle 100. The communication unit 240 transmits a takeoff instruction signal and a landing instruction signal to the uninhabited airborne vehicle 100. The communication unit 240 also transmits and receives data to and from the uninhabited airborne vehicle 100 as appropriate.

First, the controller 200 receives an input from the input-output unit 210 and transmits a takeoff instruction signal to the uninhabited airborne vehicle 100 by an instruction from the control unit 220 through the communication unit 240 (step S501).

The uninhabited airborne vehicle 100 receives the takeoff instruction signal through the communication unit 140 (step S511).

In response to the takeoff instruction signal, the rotary wing 10 is rotated by instruction from the control unit 120 to make the uninhabited airborne vehicle 100 take off (step S512).

The battery charge remaining measurement module 122 starts to measure the battery charge remaining of the uninhabited airborne vehicle 100 after the uninhabited airborne vehicle 100 takes off (step S513).

If the battery charge remaining is less than a threshold, the battery charge remaining measurement module 122 judges that the uninhabited airborne vehicle 100 may fall due to battery shortage. Then, the moving velocity measurement module 124 measures the moving velocity of the uninhabited airborne vehicle 100 (step S518).

If the moving velocity of the uninhabited airborne vehicle 100 is a threshold or more, the moving velocity measurement module 124 judges that the uninhabited airborne vehicle 100 is falling to the ground or crashing to an object at a high speed. Then, the drive module 121 of the control unit 120 drives the buffer module 111 of the drive unit 110 (step S519).

If the moving velocity of the uninhabited airborne vehicle 100 is less than a threshold, the process returns to the step S513 and continues.

If the battery charge remaining is a threshold or more, the distance measurement module 123 measures the distance between the uninhabited airborne vehicle 100 and an object (step S514).

If the distance to an object is less than a threshold, the distance measurement module 123 judges that the uninhabited airborne vehicle comes in contact with the object or is just about to fall to the ground. Then, the moving velocity measurement module 124 measures the moving velocity of the uninhabited airborne vehicle 100 (step S518).

If the moving velocity of the uninhabited airborne vehicle 100 is a threshold or more, the moving velocity measurement module 124 judges that the uninhabited airborne vehicle 100 is falling to the ground or crashing to an object at a high speed. Then, the drive module 121 of the control unit 120 drives the buffer module 111 of the drive unit 110 (step S519).

If the moving velocity of the uninhabited airborne vehicle 100 is less than a threshold, the process returns to the step S513 and continues.

If the distance to an object is a threshold or more, the distance measurement module 123 checks whether or not the distance measurement module 123 has received a landing instruction (step S515).

At this point, the controller 200 is assumed to receive an input from the input-output unit 210 and transmits a landing instruction signal to the uninhabited airborne vehicle 100 by an instruction from the control unit 220 through the communication unit 240 (step S502).

If receiving the landing instruction signal from the controller 200 (step S516), the uninhabited airborne vehicle 100 lands on the ground (step S517), but if not, the process returns to the battery charge remaining measurement in the step S513.

In this flow, immediately after receiving landing instruction information in the step S516, the uninhabited airborne vehicle 100 is made to land on the ground in the step S517. If it takes a time to make the uninhabited airborne vehicle 100 to land on the ground because, for example, the uninhabited airborne vehicle 100 is up in the air, the battery charge remaining measurement in the step S513 may be continued until the uninhabited airborne vehicle 100 actually lands on the ground. However, when the uninhabited airborne vehicle 100 is made to land on the ground by a landing instruction, the buffer module 111 is not driven even if the distance to the ground is less than a threshold of the distance to an object.

The interval of measurements of the battery charge remaining and the distance to an object may coincide with the performance of the uninhabited airborne vehicle 100 and may include an appropriate waiting time.

The threshold of the battery charge remaining, the distance to an object, and the moving velocity can be changed by instruction from a user. In this case, a user may instruct to transmit each threshold to the uninhabited airborne vehicle 200 through the input-output unit 210 of the controller 200.

In an example of the attached functional diagrams and flow charts, a buffer is driven if the battery charge remaining and the distance to an object is less than the respective thresholds. However, the acceleration sensor may also be mounted to detect fall of the uninhabited airborne vehicle 100. If the acceleration sensor detects abrupt acceleration that the rotary wings 10 cannot generates, the buffer may be driven.

The embodiments of the present invention are described above. However, the present invention is not limited to the above-mentioned embodiments. The effect described in the embodiments of the present invention is only the most preferable effect produced from the present invention. The effects of the present invention are not limited to that described in the embodiments of the present invention.

REFERENCE SIGNS LIST

10 Rotary wing
100 Uninhabited airborne vehicle
200 Controller

What is claimed is:

1. An uninhabited airborne vehicle comprising:
a rotary wing;
an airframe;
a buffer that reduces impact on the airframe when crashed;
a battery charge remaining meter that measures battery charge remaining of the uninhabited airborne vehicle;
a moving velocity meter that measures a moving velocity of the uninhabited airborne vehicle when the battery charge remaining is less than a first threshold; and
a driver that drives the buffer when the battery charge remaining is less than the first threshold and the moving velocity is greater than a second threshold while the uninhabited airborne vehicle is flying.

2. The uninhabited airborne vehicle according to claim 1, wherein the driver does not drive the buffer when the uninhabited airborne vehicle makes a landing by a landing instruction from an operator.

3. The uninhabited airborne vehicle according to claim 1, wherein the driver does not drive the buffer when the moving velocity is less than the second threshold.

4. The uninhabited airborne vehicle according to claim 1, wherein the buffer has a form to wrap the uninhabited airborne vehicle.

5. The uninhabited airborne vehicle according to claim 1, further comprising a distance meter that measures a distance between the uninhabited airborne vehicle and an object when the battery charge remaining is greater than the first threshold,
wherein the driver drives the buffer when the battery charge remaining is greater than the first threshold and the distance is less than a third threshold while the uninhabited airborne vehicle is flying.

6. The uninhabited airborne vehicle according to claim 5, wherein the distance meter removes frequency noise caused by the rotary wing of the uninhabited airborne vehicle while measuring the distance between the uninhabited airborne vehicle and the object.

7. The uninhabited airborne vehicle according to claim 5, wherein the distance meter checks whether a landing instruction has been received from an operator when the distance is greater than the third threshold, and
wherein the uninhabited airborne vehicle makes a landing by the landing instruction when the landing instruction has been received.

8. The uninhabited airborne vehicle according to claim 1, further comprising a distance meter that measures a distance between the uninhabited airborne vehicle and an object when the battery charge remaining is greater than the first threshold,
wherein the moving velocity meter measures the moving velocity of the uninhabited airborne vehicle when the battery charge remaining is greater than the first threshold and the distance is less than a third threshold, and
wherein the driver drives the buffer when the battery charge remaining is less than the first threshold, the distance is less than the third threshold, and the moving velocity is greater than the second threshold while the uninhabited airborne vehicle is flying.

9. A method of controlling an uninhabited airborne vehicle including a rotary wing, an airframe, and a buffer for reducing impact on the airframe when the uninhabited airborne vehicle is crashed, the method comprising:
measuring battery charge remaining of the uninhabited airborne vehicle;
measuring a moving velocity of the uninhabited airborne vehicle when the battery charge remaining is less than a first threshold; and
driving the buffer when the battery charge remaining is less than the first threshold and the moving velocity is greater than a second threshold while the uninhabited airborne vehicle is flying.

10. The method according to claim 9, further comprising:
measuring a distance between the uninhabited airborne vehicle and an object when the battery charge remaining is greater than the first threshold; and
driving the buffer when the battery charge remaining is greater than the first threshold and the distance is less than a third threshold while the uninhabited airborne vehicle is flying.

11. The method according to claim 10, further comprising:
checking whether a landing instruction from an operator has been received when the distance is greater than the third threshold; and
allowing the uninhabited airborne vehicle to make a landing by the landing instruction when the landing instruction has been received.

12. The method according to claim 10, further comprising removing frequency noise caused by the rotary wing of the uninhabited airborne vehicle while measuring the distance between the uninhabited airborne vehicle and the object.

13. The method according to claim 9, further comprising:
measuring a distance between the uninhabited airborne vehicle and an object when the battery charge remaining is greater than the first threshold;
measuring the moving velocity of the uninhabited airborne vehicle when the battery charge remaining is greater than the first threshold and the distance is less than a third threshold; and
driving the buffer when the battery charge remaining is less than the first threshold, the distance is less than the third threshold, and the moving velocity is greater than the second threshold while the uninhabited airborne vehicle is flying.

14. The method according to claim 9, wherein the buffer is not driven when the uninhabited airborne vehicle makes a landing by a landing instruction from an operator.

15. The method according to claim 9, wherein the buffer is not driven when the moving velocity is less than the second threshold.

16. The method according to claim 9, wherein the buffer has a form to wrap the uninhabited airborne vehicle.

\* \* \* \* \*